United States Patent
Ilg et al.

(10) Patent No.: US 8,342,298 B2
(45) Date of Patent: Jan. 1, 2013

(54) CONNECTING DEVICE FOR CONNECTION BETWEEN A BRAKE DISC AND A HUB AND METHOD FOR MOUNTING

(75) Inventors: Torvald Ilg, Enskede (SE); Rolf Fredriksson, Solna (SE)

(73) Assignee: Scania CV AB (Publ) (SE)

( * ) Notice: Subject to any disclaimer, the term of this patent is extended or adjusted under 35 U.S.C. 154(b) by 168 days.

(21) Appl. No.: 12/681,420

(22) PCT Filed: Oct. 1, 2008

(86) PCT No.: PCT/SE2008/051107
§ 371 (c)(1),
(2), (4) Date: Aug. 27, 2010

(87) PCT Pub. No.: WO2009/045162
PCT Pub. Date: Apr. 9, 2009

(65) Prior Publication Data
US 2010/0307875 A1 Dec. 9, 2010

(30) Foreign Application Priority Data
Oct. 5, 2007 (SE) ...................................... 0702242

(51) Int. Cl.
*F16D 55/36* (2006.01)
(52) U.S. Cl. ................... 188/218 XL; 188/18 A
(58) Field of Classification Search ............. 188/17, 188/18 A, 71.1, 71.3, 71.4, 73.36–73.38, 188/218 XL; 403/316, 345, 348, 355–358, 403/365, 372; 301/105.1
See application file for complete search history.

(56) References Cited

U.S. PATENT DOCUMENTS

| | | | | |
|---|---|---|---|---|
| 3,754,624 A | * | 8/1973 | Eldred | 188/71.5 |
| 5,024,297 A | * | 6/1991 | Russell | 188/18 A |
| 6,223,866 B1 | * | 5/2001 | Giacomazza | 188/73.38 |
| 6,811,005 B2 | * | 11/2004 | Blewitt et al. | 188/73.38 |
| 6,910,556 B1 | * | 6/2005 | Baumgartner et al. | 188/218 XL |
| 7,918,322 B2 | * | 4/2011 | Pahle | 188/18 A |
| 8,061,785 B2 | * | 11/2011 | Ilg | 301/105.1 |
| 2003/0006104 A1 | | 1/2003 | Baumgartner et al. | |
| 2003/0111303 A1 | * | 6/2003 | Wirtanen | 188/17 |
| 2005/0173204 A1 | | 8/2005 | Baumgartner et al. | |
| 2005/0205368 A1 | * | 9/2005 | Gripemark et al. | 188/218 XL |
| 2007/0084685 A1 | | 4/2007 | Wimmer et al. | 188/218 |
| 2009/0218183 A1 | * | 9/2009 | Burgoon et al. | 188/218 XL |

OTHER PUBLICATIONS

International Search Report dated Jan. 19, 2009, issued in corresponding international application No. PCT/SE2008/051107.
Office Action dated Nov. 24, 2011 with English translation dated Dec. 27, 2011 issued in Chinese Patent Application No. 200880110173.1 (6 pages).

* cited by examiner

*Primary Examiner* — Christopher Schwartz
(74) *Attorney, Agent, or Firm* — Ostrolenk Faber LLP

(57) ABSTRACT

The invention relates to a connecting device for connection between a brake disc and a hub. The brake disc is fitted on the hub via splined connection with recesses on the brake disc and protrusions on the hub. The connecting device is made of non-rusting material and intended to be fitted between a side surface of a recess and an adjacent side surface of a protrusion. According to the invention, the connecting device has two mutually abutting layers. These are connected to one another and separable from one another by only an axial relative movement between the layers. The invention also relates to a method for fitting a brake disc on a hub.

17 Claims, 7 Drawing Sheets

CONNECTING DEVICE FOR CONNECTION BETWEEN A BRAKE DISC AND A HUB AND METHOD FOR MOUNTING

CROSS REFERENCE TO RELATED APPLICATION

The present application is a 35 U.S.C. §§371 national phase conversion of PCT/SE2008/051107, filed 1 Oct. 2008, which claims priority of Swedish Application No. 0702242-9, filed 5 Oct. 2007, the disclosure of which is incorporated by reference herein. The PCT International Application was published in the English language.

BACKGROUND OF THE INVENTION

The present invention relates in a first aspect to a connecting device for connection between a brake disc and a hub, on which the brake disc is fitted via a splined connection with recesses on the brake disc and complementary protrusions on the hub which cooperate with them, or vice versa, which connecting device is made of non-rusting material and is intended to be fitted between a side surface of a recess and the adjacent side surface of the protrusion which cooperates with the recess.

In another aspect the invention relates to a method for fitting a brake disc on a hub whereby the brake disc is fitted on the hub via a splined connection with recesses and protrusions, and a connecting device made of non-rusting material is introduced between a side surface of a recess and the adjacent side surface of the protrusion which cooperates with the recess.

The connecting devices which are arranged between the hub and the brake disc reduce heat transmission and compensate for dimensional tolerances. They may also make it easier to remove the brake disc from the hub, e.g. on the occasion of disc change. Such removal can often be a problem because the brake disc and the hub rust firmly to one another at the splined connection. Examples of the connecting devices are described in U.S. Pat. No. 6,910,556 and U.S. Patent Publication 2007/0084685. The devices described in those specifications are mainly intended to facilitate the handling of connecting elements which are primarily configured to reduce heat transmission and are therefore double-layered.

In contexts where it is of great importance to reduce the problem of rusting up, the connecting device is made of non-rusting material.

The known devices have the disadvantage that the two layers cannot readily be parted from one another, particularly when they have been fitted.

The object of the present invention is to provide a connecting device which facilitates the fitting and removal of the brake disc and to provide a method for fitting a brake disc on a hub which is simple and facilitates the removal thereof.

The terms axial, radial and tangential used in this patent application relate to the axis of the brake disc/of the hub unless indicated otherwise.

SUMMARY OF THE INVENTION

The object stated is achieved in the first aspect of the invention by a connecting device of the relevant kind having the special features of comprising two mutually abutting layers which are separable from one another by only an axial relative movement between the layers.

The connecting device thus comprised of two mutually abutting layers of non-rusting material eliminates the risk of rusting up between the brake disc and the hub. Such rusting up may otherwise occur between the hub and the connecting device and between the brake disc and the connecting device even if the connecting device is made of non-rusting material. Where a connecting device made of non-rusting material is double-layered, however, two non-rusting surfaces will abut against one another. There is no risk of rusting up between these surfaces. There will therefore be no problem if rusting up occurs between a layer and the hub or the brake disc. This presupposes that there is freedom for the layers to move relative to one another.

Since the connecting device according to the invention is so configured that the layers are separable from one another by only an axial relative movement, this presupposition is fulfilled. Thus the layers will be easy to separate from one another even when the connecting device has been fitted between the hub and the brake disc, thus making it easier for the hub and the brake disc to be released from one another.

According to a preferred embodiment of the invented connecting device, the latter comprises at least one tongue running axially and adapted to protruding outside the recess when the connecting device has been fitted, which tongue is comprised of a protruding portion of each said mutually abutting layer, which portions are connected to one another by a detachable firm connection.

The fact that the two layers are connected to one another by a connection which, when the connecting device has been fitted, protrudes outside the recess renders it readily accessible for release to allow axial relative movement of the layers. A firm connection also affords greater assurance that, before the connecting device is fitted, the two layers are held together as a unit than if, for example, they were connected only by friction, clamping effect or some form of adhesive. The fact that the layers are held together as a unit facilitates handling, particularly during fitting. The firm connection being situated on a protruding tongue also results in greater simplicity than if it was situated in a region which, when the connecting device has been fitted, is situated in the gap between the recess and the protrusion. There are also technical manufacturing advantages in the firm connection being situated on a protruding tongue.

According to a further preferred embodiment, the firm connection is arranged at the outer end of the tongue.

Both manufacture and accessibility for releasing the connection are thus facilitated.

According to a further embodiment, the connecting device is made in one piece folded 180° about a fold line which constitutes the outer end of the tongue.

The fact that the connecting device with its two layers takes the form of a single piece affords further technical manufacturing advantages in that its manufacture will in principle involve only a stamping operation and a bending operation.

According to a further preferred embodiment, said portions at the fold line are connected to one another by a web portion which is less wide in a direction parallel to the fold line than they are.

The smaller dimension at the fold line facilitates both the folding operation and the release of the connection. Only a moderate axial relative force between the two layers will be required for the web portion to break and the connection to be thereby released.

According to a further preferred embodiment, the connecting device has a substantially U-shaped profile as seen in the axial direction with a substantially planar intermediate portion with a substantially planar limb at each end, which limbs form substantially right angles with the intermediate portion, the connecting device being adapted to fitting with a limb between each pair of complementary side surfaces formed between cooperating recesses and protrusions and with the intermediate portion between the bottom of the recess and the crest of the protrusion.

This version of the connecting device affords major advantages when fitting brake discs on the hub. In the first place, it halves the number of parts to be handled as compared with having a separate connecting device at each radial gap in the splined connection between the brake disc and the hub. Such a connecting device will also be easy to place in position because it can either straddle a protrusion or be inserted in a recess, and it will be kept in position by shape until the brake disc and the hub are brought together.

According to a further preferred embodiment, the tongue is arranged at the intermediate portion.

The geometry thus becomes optimum for easy manufacture and easy release of the connection at the tongue.

According to a further preferred embodiment, the connecting device is provided with two or more tongues which are all arranged at the intermediate portion.

Two tongues result in advantageous symmetry of the connecting device, thereby facilitating controlled release of the connection. If the connection is formed by folding, the fold line also becomes longer and hence the folding operation more distinct so that correct orientation of the layers is assured more easily.

According to a further preferred embodiment, the intermediate portion of at least one layer has running through it a tangential slit extending across the portion situated centrally between the limbs.

The slit results in the respective layers having a certain elasticity in the axial direction. A clamping force is thus achieved when the connecting device is firmly tightened axially. With advantage, each of the two layers is provided with such a slit.

According to a further embodiment, the inner layer has on its inside a chamfer facing outwards at one axial end edge of each limb and/or the outer layer has on its outside a chamfer facing inwards at the other axial end edge of each limb.

These chamfers make it easier to apply the connecting device on a protrusion or to insert it in a recess, depending on which mode of fitting is chosen.

According to a further preferred embodiment, each limb of the inner layer forms an angle with the intermediate portion which is somewhat smaller than 90° and/or each limb of the outer layer forms an angle with the intermediate portion which is somewhat larger than 90°. Somewhat smaller or larger means a difference within the range 0.5° to 5°, preferably 1° to 2°.

A resilient clamping force is thus achieved between the connecting device and the protrusion or recess, depending on which mode of fitting is chosen. The clamping force reduces the risk of the connecting device loosening during the fitting operation.

The invention further refers to a hub and a brake disc fitted on the hub, the brake disc being fitted on the hub by connecting devices according to the invention or any of the foregoing embodiments of it.

According to a preferred embodiment of the invented hub and the brake disc, the detachable firm connection is released. This means that a release takes place at the time of fitting the brake disc on the hub, which will then be very easy to do. This means that there is no need to worry about taking measures for releasing the connection when the brake disc is due to be removed.

The invention also relates to a vehicle provided with a disc brake in which the brake disc is fitted on the hub in accordance with the invented brake disc and hub arrangement.

The invented brake disc and hub arrangement and the invented vehicle utilise the advantages afforded by the invented connecting device and the preferred embodiments of it and referred to above.

The stated object is achieved in the second aspect of the invention by a method of the relevant kind comprising the special measures that the connecting device introduced has two mutually abutting layers connected to one another and that they are introduced in such a way that they can be separated axially from one another in the fitted position.

According to a preferred embodiment of the invented method, the two mutually abutting layers are connected to one another by a firm connection, and during fitting an axial force is applied to one layer so that the connection is released.

According to a further preferred embodiment of the invented method it is implemented with use of a connecting device in accordance with the invention or any of the preferred embodiments thereof. The invented method and the preferred embodiments of it afford advantages of corresponding steps indicated above for the invented connecting device and its preferred embodiments.

The invention is made clearer by detailed embodiment examples of the invention set out below with reference to the accompanying drawings.

DESCRIPTION OF PREFERRED EMBODIMENT EXAMPLES

Figure 1:
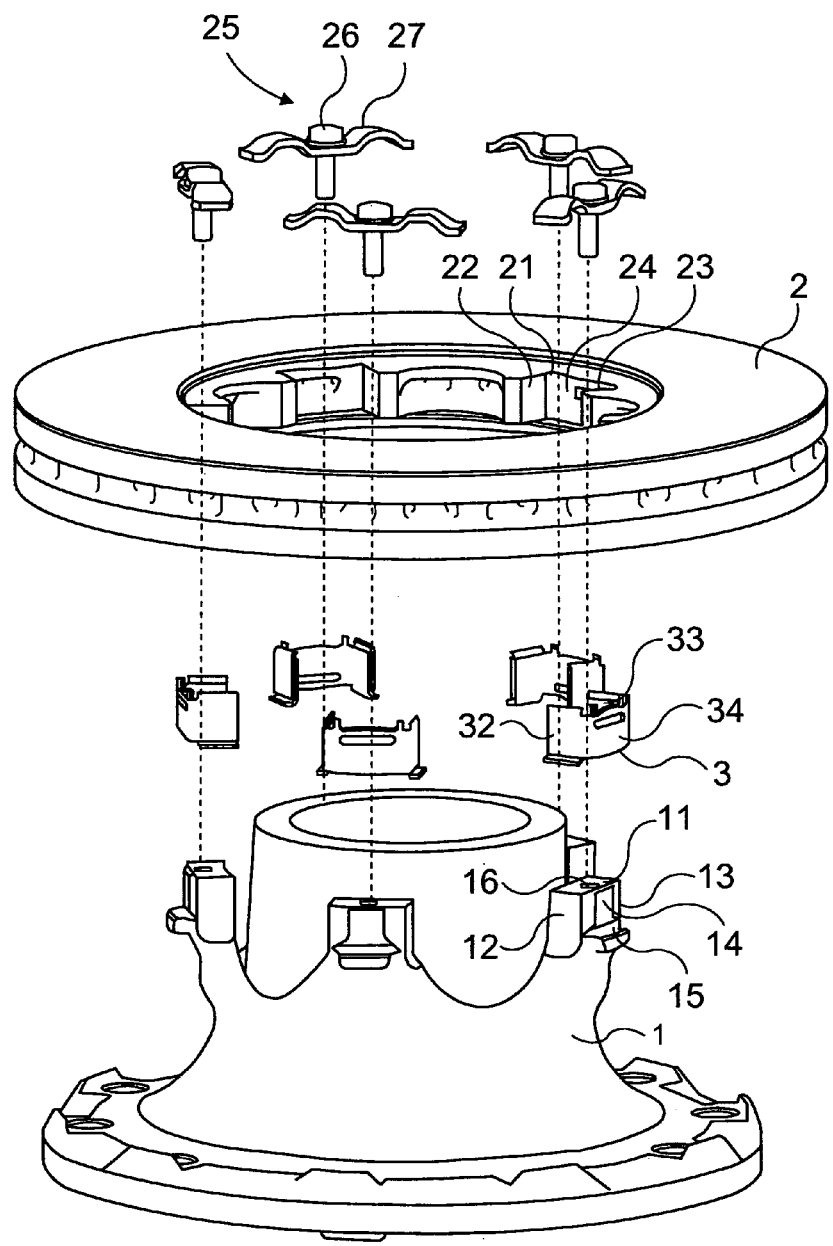
FIG. 1 is an exploded view of a brake disc and hub arrangement according to the invention.

FIG. 1 illustrates a brake disc and hub arrangement according to the invention in an exploded view. The hub 1 is provided with a number of protrusions 11, in the example depicted five evenly distributed in the circumferential direction. The brake disc 2 is provided with a corresponding number of recesses or hollows 21 of complementary shape such that the brake disc 2 can be slid onto the hub 1 axially with each protrusion 11 fitting in a corresponding hollow 21.

When the brake disc 2 is fitted on the hub, a connecting device 3 is arranged in a clearance provided for the purpose between each cooperating protrusion 11 and hollow 21. Each connecting device in the example depicted is substantially U-shaped so that in the fitted position it fills intermediate spaces on three sides between the respective protrusion 11 and hollow 21. To this end, one limb 32 is placed between a pair of side surfaces 12, 22 of the respective protrusion and hollow, the other limb 33 between the other pair of side surfaces 13, 23 of the protrusion and the hollow, and the intermediate portion 34 between the crest 14 of the protrusion and the bottom 24 of the hollow.

Each connecting device 3 is comprised of two layers in a manner determined in more detail below.

When the brake disc 2 has been slid onto the hub 1 with the connecting devices 3 in position, the brake disc 2 is firmly locked axially to the hub 1 by fastening means 25, comprising a bolt 26 and a pressure washer 27, by the bolt 26 being screwed into a hole 16 on the protrusion 11.

Figure 2:
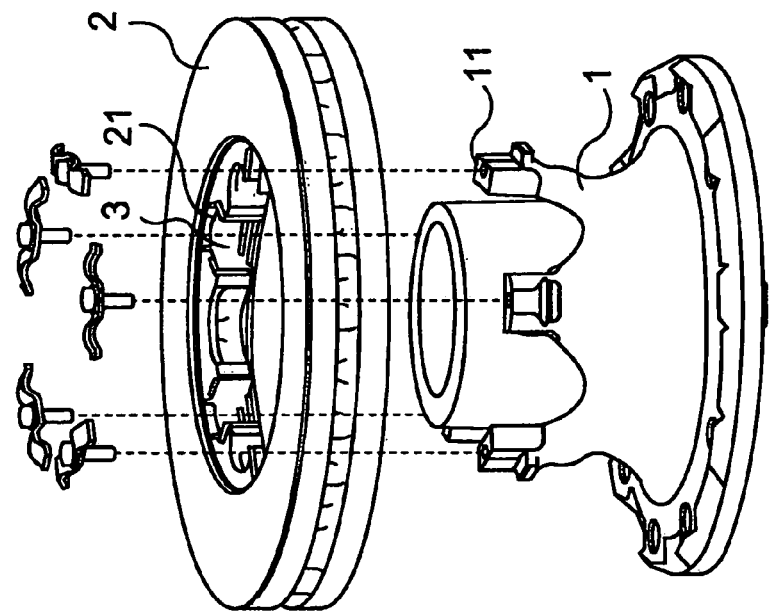
FIG. 2 is a view corresponding to FIG. 1 but with the connecting device slid onto the hub.

FIG. 2, which is an exploded view corresponding to FIG. 1, illustrates a first step in fitting the brake disc 2 on the hub 1. At this stage, the connecting devices 3 have been slid onto respective protrusions 11 on the hub 1, and the brake disc 2 is ready for sliding onto the hub 1.

Figure 3:
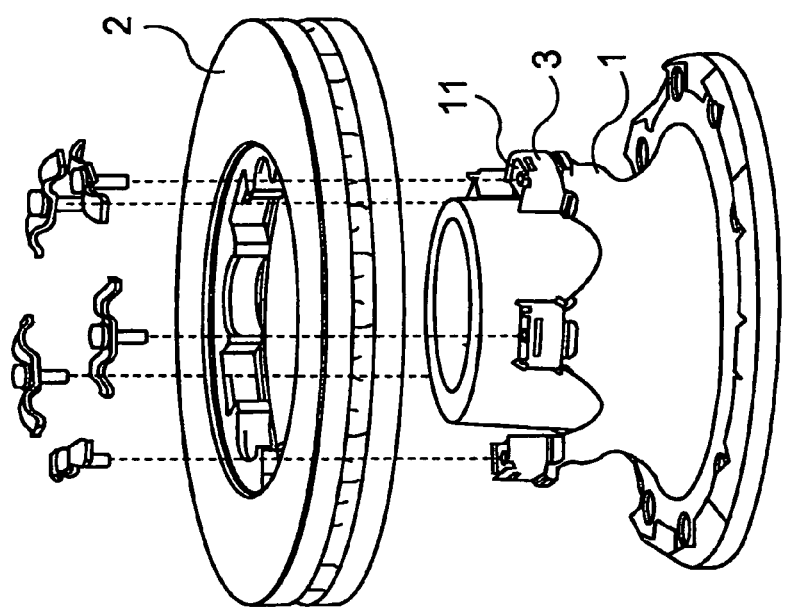
FIG. 3 is a view corresponding to FIG. 2 in which the connecting device is instead placed in the brake disc.

FIG. 3, which is an exploded view corresponding to FIGS. 1 and 2, illustrates instead the connecting devices being initially fitted in the recesses 21 in the hub 1, which is an equally valid alternative to what is illustrated in FIG. 2.

Figure 4:
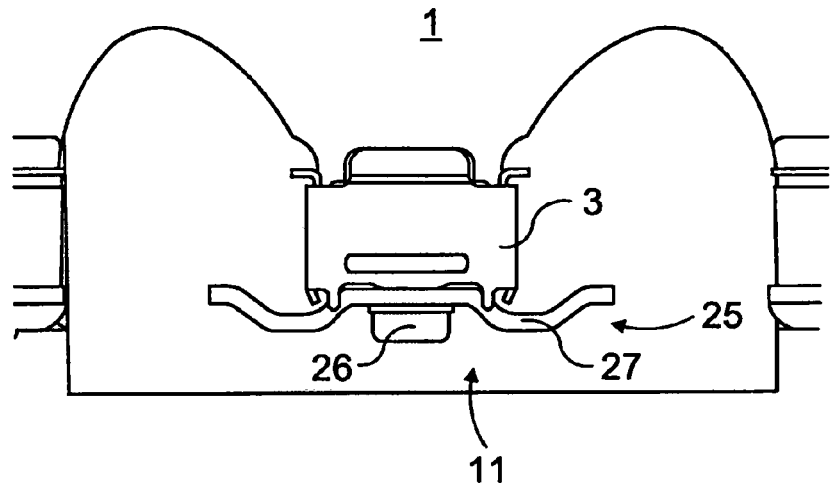
FIG. 4 is a radial view of part of the hub with the connecting device slid onto it.

FIG. 4 is a radial partial view of a protrusion on the hub 1 with a connecting device 3 placed there. When the brake disc has been fitted on the protrusion of the hub, it is locked firmly by the fastening device 25. For the sake of clarity, however, the brake disc is omitted from this diagram. Tightening the bolt 26 of the fastening device 25 causes the middle portion of the pressure washer 27 to press the connecting device 3 against a bearing surface 15 on the hub 1 (see FIGS. 5 and 6). The lateral portions of the pressure washer press the brake disc 2 (not depicted) firmly onto the hub 1.

Figure 5:
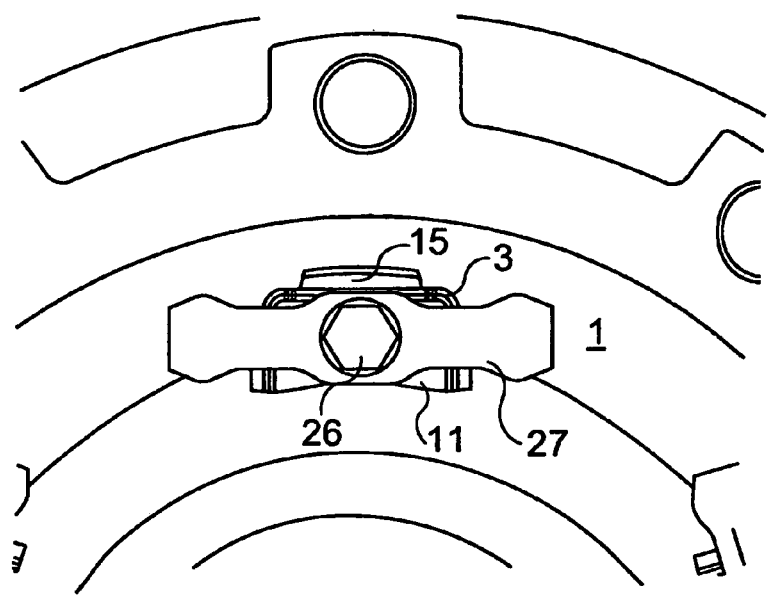
FIG. 5 is an axial view of the detail in FIG. 4.
Figure 6:
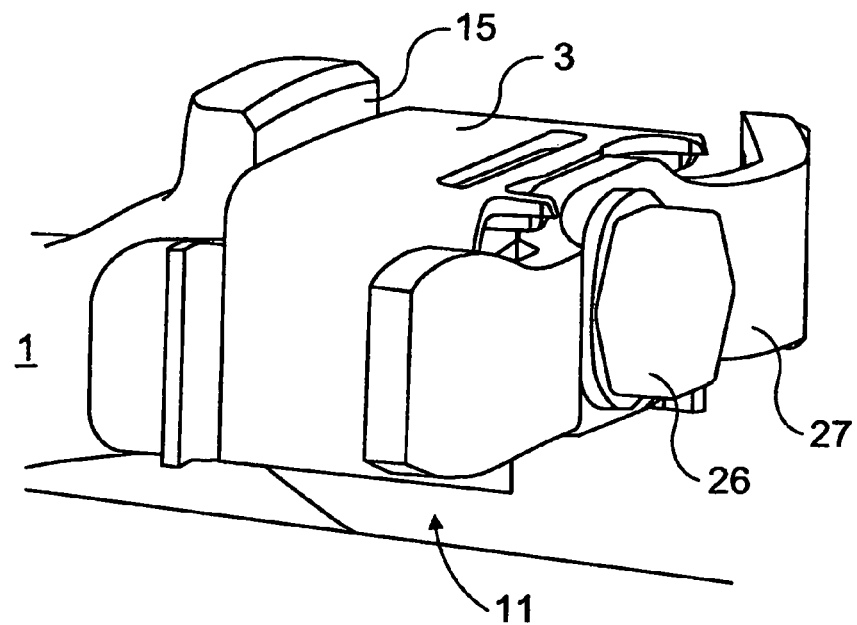
FIG. 6 is a perspective view of the detail in FIG. 4.

FIGS. 5 and 6 depict details of FIG. 4 in an axial view and a perspective view respectively.

Figure 7:
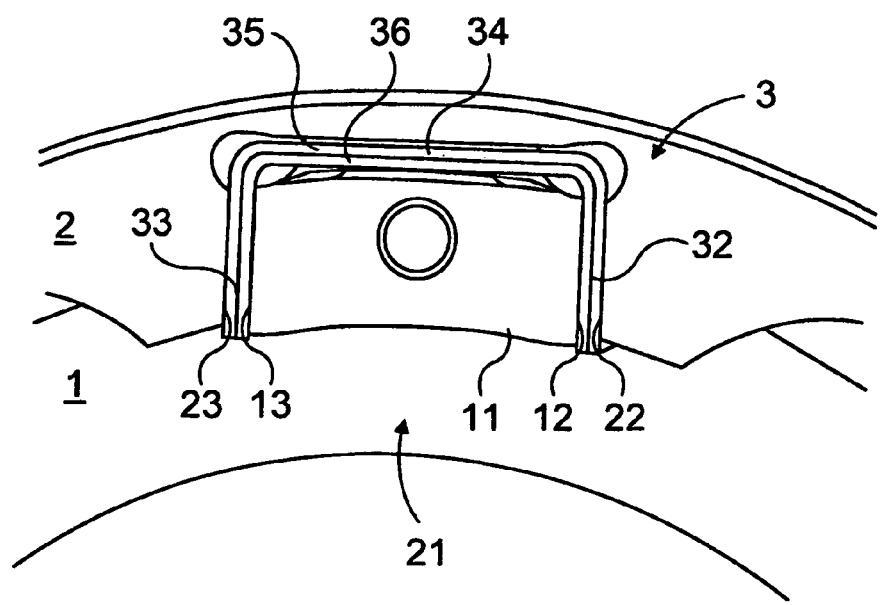
FIG. 7 is an axial view of the connecting device inserted between the brake disc and the hub.

FIG. 7 depicts an axial partial view of a brake disc 2 fitted on the hub 1 before they are pressed together by the fastening device. It shows the connecting device 3 situated between the protrusion 11 and the hollow 21. It shows most clearly how the connecting device 3 is made up of an outer layer 35 and an inner layer 36. The intermediate portion 34 is situated between the crest 14 of the protrusion 11 and the bottom 24 of the hollow 21 with a certain intermediate space relative to both said crest and said bottom. The limb 33 (the left one in the diagram) is situated with a relatively precise fit between the sidewall 23 of the hollow 21 and the sidewall 13 of the protrusion 11.

Figure 8:
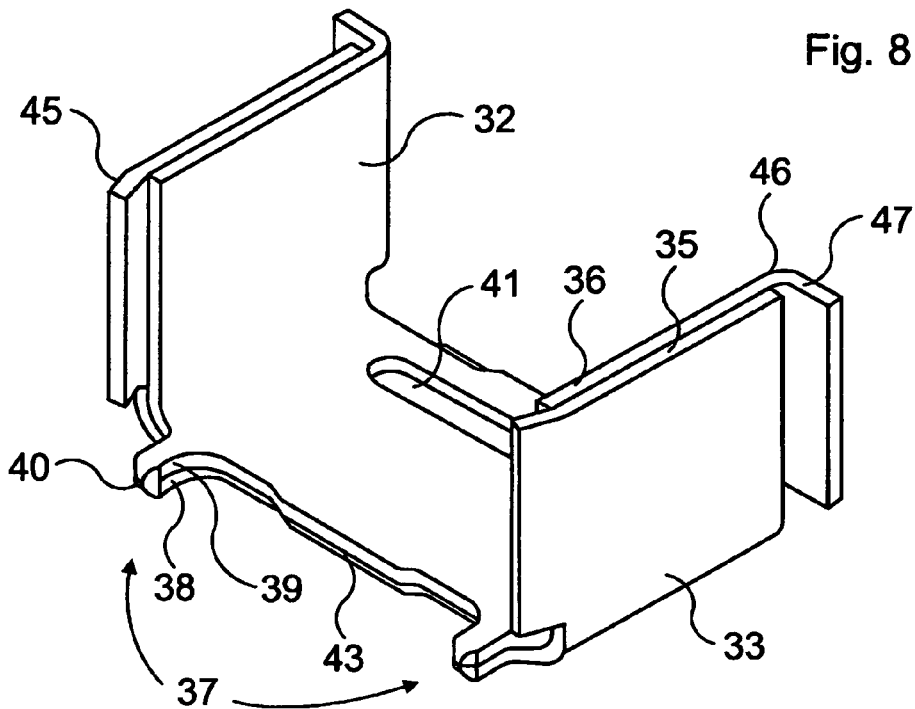
FIG. 8 is a first perspective view of a connecting device.
Figure 9:
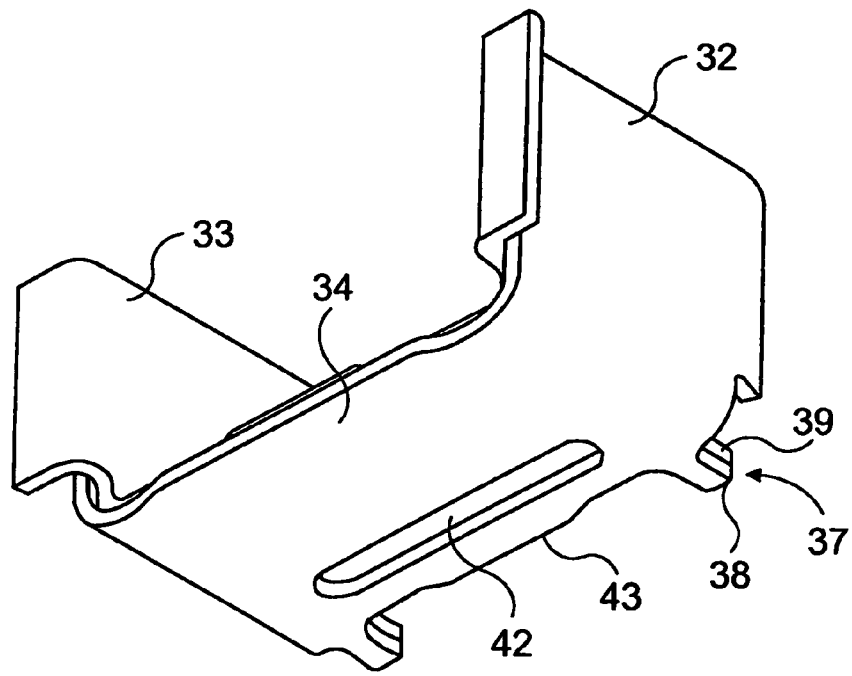
FIG. 9 is a second perspective view of the connecting device in FIG. 8.

FIGS. 8 and 9 depict the connecting device in two different perspective views. Its intermediate portion 34 has two protruding tongues 37 which each comprise a portion 38 of the outer layer 35 and a portion 39 of the inner layer 36. The two portions 38, 39 are joined by a connection 40 at the outer end of the tongue 37.

The outer layer 35 has on the intermediate portion a slit 42 on the half of it which is situated closest to the tongues 37. The slit 42 runs in a tangential direction across almost the whole intermediate portion. A corresponding slit 41 is accommodated in the inner layer 36. For each slit the distance from the nearest axial end edge is about 15-20% of the whole axial extent of the intermediate portion. Each slit has a width equal to or somewhat larger than the distance from the nearest axial end edge.

The intermediate portion further has an axially protruding portion 43 situated between, but of considerably shorter axial extent than, the tongues 37.

The outer layer 35 on each limb 32, 33 is slightly angled inwards at its end situated nearest to the tongues 37 so that a chamfer 45 is formed. The inner layer 36 on each limb is nevertheless bent outwards at its further point from the tongues 37 to constitute an outward-facing flange 47, with the formation of a circular chamfer 46 at the point where it bends outwards.

Figure 10:
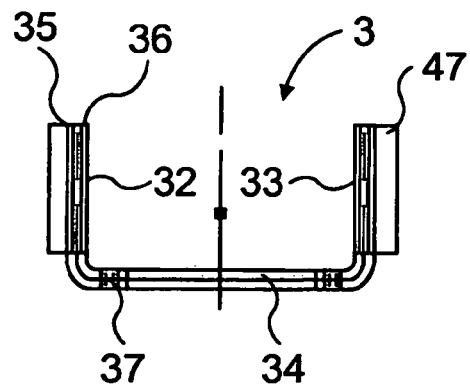
FIG. 10 is an axial view of the connecting device in FIG. 8.

The axial view of the connecting device in FIG. 10 shows the two limbs 32, 33 forming nearly right angles with the intermediate portion 34. The inner layer 36 of each limb is, however, somewhat angled inwards, about 0.5° to 2°, while the outer layer of each limb is angled outwards correspondingly. As the angles concerned are so small, this is not visible in the drawing.

Figure 11:
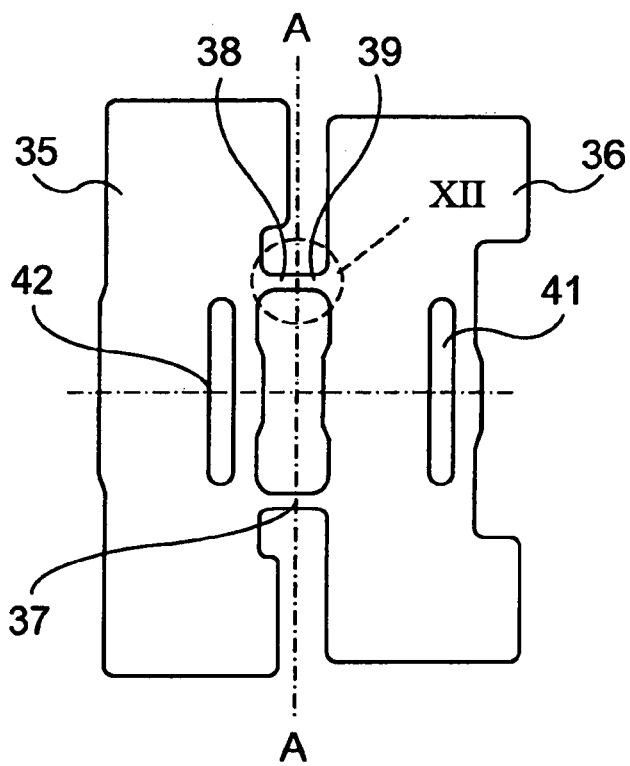
FIG. 11 is a plan view of the connecting device in FIG. 8 before it is folded.

FIG. 11 is a plan view of a stamped-out workpiece for constituting the connecting device. The piece in FIG. 11 is totally planar. By certain bending movements the piece depicted can be converted to the form illustrated in FIGS. 8 and 9. The piece is initially folded 180° about the fold line A-A, resulting in the formation of the two layers, with the fold line constituting the outer end of the tongues 37 and the connection by which the tongues are connected. Thereafter the U-shape and other bent portions are formed.

Figure 12:
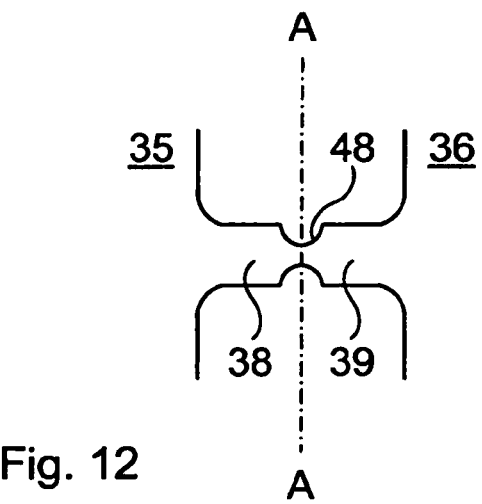
FIG. 12 is a plan view of a detail of the connecting device in FIG. 11 in a modified version.

FIG. 12 depicts a detail of a piece corresponding to that in FIG. 11, but with an alternative embodiment. The detail comprises the ringed region. In this version the region which after the folding constitutes the tongues 37 has a web portion 48 at the position of the fold line, i.e. it is narrower than the tongues elsewhere.

Figure 13:
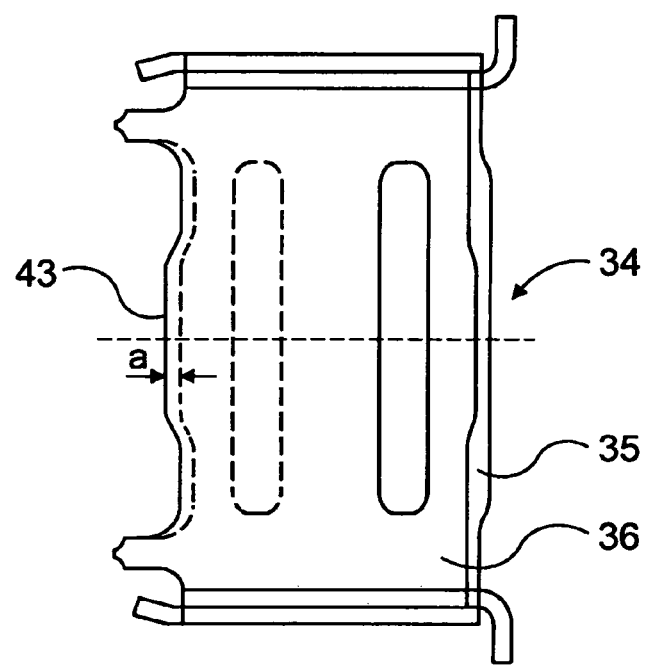
FIG. 13 is a radial view of the connecting device in FIG. 8.

As illustrated by the radial view in FIG. 13 of the connecting device, the two layers are axially displaced relative to one another by a distance a which may be about 1 mm. When assembling the connecting device, as described in broad terms in relation to FIGS. 1-4, the axial clamping force is applied from the pressure washer 27 against the axially protruding portion 43 of the intermediate portion 34. Owing to the displacement a, this force is only applied initially against the edge of said portion 43 of the inner layer. An axial relative force then acts between the layers, causing the connection 40 at the outer end of the tongue 37 to break so that the layers are released from one another. Continued tightening of the pressure washer 27 thereafter will move the inner layer axially to the right in FIG. 13 until the edges of the respective portions 43 of the both layers have the same axial position, after which continued tightening firmly clamps the two layers axially.

Thus when the brake disc has been fitted, the connecting device will have the connection 40 released.

When the brake disc is due to be removed, the pressure washer 27 is loosened. Thereafter all that has to be done is to draw the brake disc axially out from the hub. Should either of the layers have rusted firmly to the brake disc or the hub, this will not cause any hindrance, since the two layers will already have been released from one another at the time of fitting. Moreover, the two layers are made of non-rusting material, so no rusting up between them is to be expected.

Insofar as the connecting device is not configured as in the example referred to above but in such a way that the connection 40 is maintained even after fitting, removal will involve that connection having to be released. This can be done easily by cutting the tongues 37. The example depicted, however, makes removal easier in that that operation is eliminated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A connecting device configured to connect a brake disc and a hub on which the brake disc is fitted, the connecting device comprising:
   a connecting device body positioned in at least one axial direction recess formed in a splined connection connecting a hub and a brake disc around an axial projection of the hub,
   wherein the brake disc has a through opening shaped to be fitted around the hub, and the brake disc being connected to the hub via a splined connection between the hub and the disc,
   wherein the recess is positioned in one of the through opening in the brake disc around the hub and the axial projection of the hub opposite the opening in the brake disc and a protrusion complementary to the recess on the other of the hub and the through brake disc,
   wherein the recess has a first side surface and the protrusion has a corresponding adjacent second side surface that cooperates with the first side surface of the recess;
   the recess and the protrusion having an axial extent, such that the brake disc is placed on the hub by axial movement thereof so as to move the protrusion into the recess;
   the connecting device body comprising:
   two overlapping mutually abutting layers positioned in the recess, each layer having an axial extent, with one of the abutting layers facing into the recess and the other layer facing the protrusion, the two layers of the connecting device being connected to one another to form the layers of the connecting device as one piece comprised of the two layers,
   wherein the two layers are positioned and configured to remain together during use of the brake disc, and are configured to separate from connection to one another upon axial relative movement between the layers when the brake disc is to be replaced by removal from the hub.

2. A connecting device according to claim 1, wherein each layer of the two layers comprises a protruding portion,
   wherein the connecting device comprises at least one tongue extending axially of the hub and protruding axially outside the recess when the abutting layers have been fitted in the recess,
   wherein the tongue is comprised of the protruding portion of each of the abutting layers, and the protruding portions are connected to one another by a detachable connection which is releasable when one layer shifts axially in the recess with respect to the other layer.

3. A connecting device according to claim 2, wherein the tongue has an outer edge out of the recess and the detachable connection is arranged at the outer edge of the tongue.

4. A connecting device according to claim 3, wherein the abutting layers of the connecting device are of one piece folded 180° about a fold line at which constitutes the outer end of the tongue is formed.

5. A connecting device according to claim 3, further comprising a web portion connecting the protruding portions at the fold line and the web portion is of smaller width in a direction parallel with the fold line than the respective protruding portions.

6. A connecting device according to claim 1, wherein the abutting layers of the connecting device have a substantially U-shaped profile in the axial direction including a substantially planar intermediate portion and a substantially planar limb at each end of the intermediate portion, each limb being fitted between a respective pair of two respective complementary side surfaces of the recess and the protrusion formed between the recess and the protrusion and the intermediate portion being fitted between a bottom of the recess and a crest of the protrusion.

7. A connecting device according to claim 6, wherein the connecting device comprises at least one tongue extending axially of the hub and protruding axially outside the recess when the abutting layers have been fitted in the recess, the tongue is comprised of a respective protruding portion of each of the abutting layers, and the protruding portions are connected to one another by a detachable connection which is releasable when one layer shifts axially in the recess with respect to the other layer and the at least one tongue is arranged at said intermediate portion.

8. A connecting device according to claim 7, wherein the connecting device layers comprise two or more of the tongues arranged at said intermediate portion.

9. A connecting device according to claim 6, wherein the intermediate portion of at least one of the layers has a slit running tangentially through it the slit extends across the intermediate portion situated centrally between the limbs.

10. A connecting device according to claim 6, further comprising the inner one of the layers has an outward-facing chamfer at one axial end edge of each limb and directed away from the other said limb, and the outer one of the layers has an inward-facing chamfer and directed toward the other limb at an opposite axial end edge of each limb.

11. A connecting device according to claim 6, wherein each limb of the inner layer forms with the intermediate portion an angle somewhat smaller than 90° and each limb of the outer layer forms with the intermediate portion an angle somewhat larger than 90°.

12. The connecting device according to claim 6, wherein the limbs form substantially right angles with the intermediate portion.

13. The connecting device of claim 1, further comprising a fastening device extending in the axial direction for engaging and pressing the disc on the hub and fastening the disc on the hub, the fastening device including a portion engaging one of the abutting layers of the connecting device axially, and the fastening device and the layers being so configured that the fastening device presses axially on the one layer and causes axial relative movement thereof with respect to the other layer for separating the layers.

14. The connecting device according to claim 13, wherein the fastening device is tightened onto the hub and presses on the disc.

15. A hub, a brake disc mounted on the hub and a connecting device according to claim 1 fitting the brake disc on the hub by the connecting device.

16. The connecting device according to claim 1, wherein the layers of the connecting device are comprised of a non-rusting material.

17. A connecting system for connecting a disc with a hub, the connecting system comprising:
   the hub including an axial projection;
   the disc including a through opening shaped to be fitted around the axial projection of the hub, and the disc being connected to the hub on which the disc is fitted by a splined connection between the hub and the disc thereon;
   the splined connection comprising at least one axial direction recess in one of the opening in the disc around the hub and the axial projection of the hub opposite the opening in the disc and a protrusion complementary to the recess on the other of the hub and the disc, wherein the recess has a first side surface and the protrusion has a corresponding adjacent second side surface that cooperates with the first side surface of the recess, wherein the recess and the protrusion have an axial extent, such that the disc is placed on the hub by axial movement thereof which moves the protrusion into the recess;

the connecting device comprising two overlapping mutually abutting layers in the recess, each layer having an axial extent, with one of the two abutting layers facing into the recess and the other layer facing the protrusion, the layers of the connecting device being connected to one another to form the layers of the connecting device as one piece comprised of the two layers; and the two layers are positioned and configured to remain together during use of the disc, and are configured to separate from connection to one another upon axial relative movement between the layers when the disc is to be replaced by removal from the hub.

* * * * *